Figure 1:
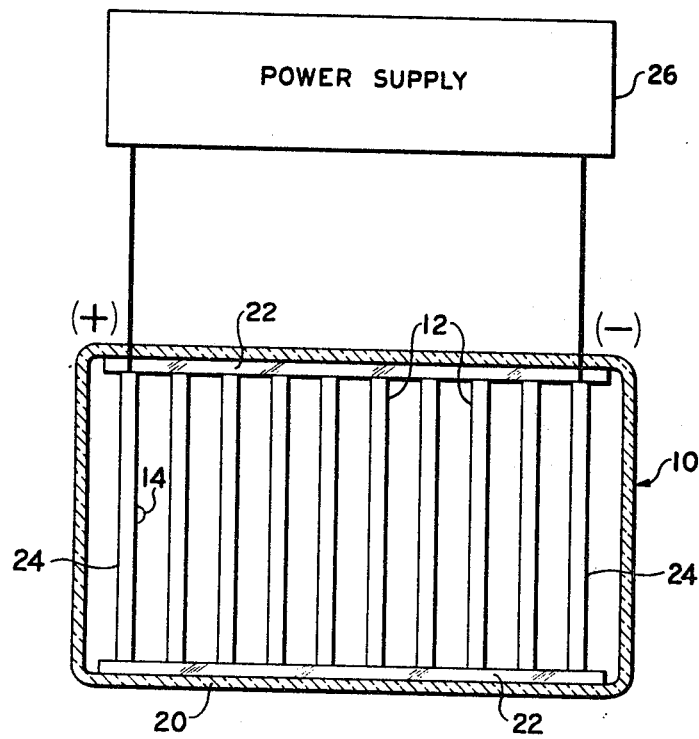

June 17, 1969  E. J. HELLUND  3,450,617
METHOD OF CONDUCTING CHEMICAL REACTIONS IN A GLOW DISCHARGE
Filed Aug. 22, 1966

United States Patent Office 3,450,617
Patented June 17, 1969

3,450,617
METHOD OF CONDUCTING CHEMICAL REACTIONS IN A GLOW DISCHARGE
Emil J. Hellund, South Laguna, Calif., assignor to Hooker Chemical Corporation, Niagara Falls, N.Y., a corporation of New York
Filed Aug. 22, 1966, Ser. No. 573,929
Int. Cl. B01k 1/00
U.S. Cl. 204—164                    7 Claims This invention relates to a glow discharge reactor particularly suited for electrochemical reactions, and more particularly to a high capacity glow discharge reactor having the voltage gradient advantages of a small reactor while providing a high production capacity. More particularly, the invention relates to a cascade type glow discharge reactor having a plurality of electrodes in a spaced relationship to each other. It also relates to glow discharge methods of conducting chemical reactions.

Glow discharge reactions have been previously known and used for the synthesis of various desirable chemicals which may be more difficult or expensive to prepare by normal chemical or electrochemical methods. As interest in large scale production of the various chemicals produced by these methods has increased, the need for apparatuses capable of subjecting large volumes of gaseous reactants to a glow discharge to produce the chemicals in quantity has also increased.

It is an object of this invention to provide a glow discharge reactor particularly suited for subjecting large volumes of gaseous reactants to a glow discharge while retaining the desirable characteristics of small glow discharge reactors. It is another object of this invention to provide a glow discharge reactor, particularly suited for operation at widely varying temperatures, pressures and electrical capacities. These and other objects will become apparent to those skilled in the art from a description of the invention which follows.

In accordance with the invention, a glow discharge reactor for electrochemical reactions is provided comprising a reaction chamber having a reactant inlet means and a reactant outlet means separated by electrode means, said electrode means comprising two terminal electrically conductive parallel strips between which is positioned at least one similar conductive strip, said conductive strips being in a spaced relationship to each other in substantially the same plane and being electrically insulated from each other, said terminal strips having connecting means for the attachment of a source of electrical current.

Figure 2:
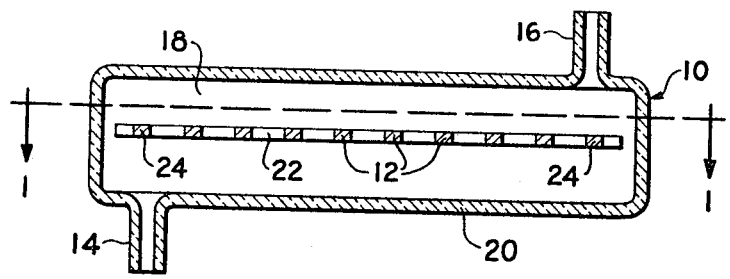

The invention will be described more fully with reference to the drawing in which:

FIG. 1 is a semi-schematic top plan view along plane 1—1 of FIG. 2 illustrating the apparatus of the present invention; and FIG. 2 is a side sectional view of the apparatus of FIG. 1 further illustrating the present invention.

Glow discharge reactor 10 comprises a plurality of electrodes 12 and 24 in a spaced relationship to each other positioned between inlet means 14 and outlet means 16. Electrode means 12 and 24 are positioned in reaction chamber 18 and secured to reactor side walls 20 by means of insulating means 22. Terminal electrodes 24 are attached to a source of electrical current, such as power supply 26. The current supply to terminal electrodes 24 is induced to electrodes 12 in cascade fashion from electrode to electrode, thereby completing the circuit to power supply 26. Electrodes 12 and 24 are conductive strips of metal, wires, cables or the like in substantially evenly spaced relationship to each other. Thus, the electrodes preferably lie in the same plane, parallel to each other.

The distance between the electrodes depends on numerous factors, particularly the particular reaction contemplated. In a chlorine-oxygen reaction the electrode distance is preferably about 0.01 millimeter to about 5 millimeters, and more preferably about 0.1 to 0.5 millimeter. The particular distance between electrodes can be made to suit the particular reactant and reaction conditions desired in the glow discharge.

The length of the electrodes is preferably substantially greater than the distance between the electrodes and more preferably the length is about 10 up to about 10,000 or more times the distance between adjacent electrodes. In a typical embodiment, the electrode length may be 10 to 50 centimeters.

The thickness of the electrodes can also be varied within wide limits, for instance, from a minimum thickness equal to that sufficient to provide structural support for the electrode to a thickness of about 5 centimeters, depending upon the particular metal used, its conductivity, whether internal cooling is provided and the like. Preferably, an electrode thickness of about 0.1 millimeter to about 2 centimeters is preferred. The width of the electrode can also be varied between about 0.1 millimeter to about 10 centimeters or more. When a wire is used for the electrode, a corresponding diameter is used.

The electrodes may be of any conductive metal, preferably a metal resistant to the reactants and the reaction products formed during the glow discharge. When the reactant is a corrosive material, inert metals, such as titanium, platinum, gold, silver, tantalum, and the like are preferably used. When other less corrosive reactants are contemplated, the inert metals as well as other metals, such as low carbon steel, chromium, nickel, copper, and the like and alloys thereof are suitable conductive materials. Stainless steel has been found to be a very suitable electrode material for numerous reactants and reactant conditions.

The electrodes can be cooled if desired by including an internal space or cavity within the electrode and providing the same with inlet and outlet ducts for the flow of a coolant therethrough. Temperature control means to control the temperature of the coolant can also be provided in association therewith.

In constructing the present apparatus, the variables in electrode positioning, the number thereof, metal conductivity and the like are considered in the light of the particular reactants contemplated and reaction conditions therefor, so as to result in an apparatus having the sum of the voltage drops between each electrode being less than the voltage drop through the gas from terminal electrode to terminal electrode. The voltage drop through the gas is dependent upon the particular gas, the temperature, the pressure and the like.

The electrodes are positioned within the reactor by attaching to insulating means 22 which can be any electrical insulator resistant to the environment within the reactor. Such material can be the same as the reactor or of similar material.

The reactor is preferably constructed of a non-conductive material resistant to the environment encountered in the glow discharge reaction contemplated. Particularly suitable materials of construction are glass, quartz, ceramic, and the like. With certain reactants and reaction conditions, various non-conductive plastic materials can also be used. Because glow discharges are often characterized by low pressures, but not necessarily of high vacuum, the structural material utilized is of sufficient strength to contain the reaction under the particular reaction conditions contemplated. Thus, the present apparatus is capable of sustained operation under pressures as low as about 0.5 micron of mercury pressures to about atmospheric pressure. It is also sometimes desirable to operate under superatmospheric conditions. Depending on the operating conditions contemplated, a structure of corresponding strength is provided.

The number of electrodes utilized within the reactor can be varied from three to about 50 or more, and more preferably is in the range of about 5 to 20 electrodes. The most desirable number of electrodes is dependent upon the spacing between the electrodes contemplated, the particular reactants for which the apparatus is designed, the pressures utilized, the sum of the voltage drops as previously described, and the like. Such modifications can be readily made in accordance with the invention.

In the operation of the present apparatus, the flow rate of reactant gases through the glow discharge zone is adjusted to suit the particular reaction being performed. Preferably the flow rate is adjusted to provide a dwell time in the glow discharge zone of less than one second and more preferably less than 0.5 second.

The term "glow discharge" is used herein in its normal technical sense to mean an electrical discharge between an anode and a cathode wherein the cathode function is carried out by ion or photon bombardment of the cathode. The discharge is normally at ambient temperatures with little heating effect. As was previously stated, the glow discharge is often characterized as normally of low pressure, but not necessarily of high vacuum. The discharge is normally sustained in the pressure range of about 1 micron to about 300 millimeters of mercury pressure for a normal glow discharge. Higher pressures can be utilized, particularly when external ionizing means are employed. Such a discharge is of a self-sustaining type having flat voltage/amperage characteristics. By this is meant that small variations in voltage effect large variations in current. A further description of glow discharges and other types of plasmas can be found in the book, The Plasma State, by E. J. Hellund (1961) Reinhold Publishing Corporation.

The present reactor can be operated at ambient temperatures or, as may be desired in certain reactions, at low temperatures approaching the condensation temperature of the gaseous reactants of the particular gaseous reactant at the particular reaction pressure, that is, about —100 degrees centigrade, or at elevated temperatures up to about 500 degrees centigrade. Because glow discharge reactions are normally carried out near room or lower temperatures wherein the stability of the reaction products is best maintained, the present reactor is particularly suited for such reactions. Of course, when higher or lower temperatures are required, suitable cooling and heating means can be provided.

The present apparatus is operated by connecting the terminal electrodes to a source of electrical current, applying a voltage across the electrodes and adjusting the power lever to obtain a diffused glow between each of the electrodes from terminal electrode to terminal electrode. The voltage employed is a function of the reactants fed to the reactor, the temperature, the length of the electrodes, the particular metal used for the electrodes, the distance between the electrodes and pressure in the discharge zone. Normally, the voltage imposed between the electrodes is of a field gradient of about 100 to 300 volts per centimeter between terminal electrodes in a pressure range of about 5 to 25 millimeters of mercury pressure. It is recognized that the voltage can vary widely with the particular pressures used, the distance between electrodes and the length of the electrodes, being generally within the range of about 100 volts per centimeter of distance between terminal electrodes at a pressure of about 5 millimeters of mercury and about 10,000 volts per centimeter of distance between terminal electrodes at pressures approaching atmospheric. Although direct current is preferred, when alternating current is utilized, the alternating current supply is normally 60 cycles per second but can be of a lesser or higher frequency. Alternating currents of 20 to 100 kilocycles and more can be used, with the preferred range being about 50 to 1,000 cycles per second.

In commercial or semi-commercial operations of the present apparatus, a multitude or bank of reactors can be used. The reactors can be of various sizes, electrode lengths, and number of electrodes as described herein.

The following example illustrates certain preferred embodiments of the present invention. Unless otherwise indicated, all parts and percentages used herein are by weight and all temperatures in the example and claims are in degrees centigrade.

EXAMPLE

A glow discharge apparatus particularly suited for the synthesis of chlorine oxides from chlorine and oxygen is constructed in accordance with the present invention for ambient temperature operation under reduced pressures of about 1 to 25 millimeters of mercury absolute.

The apparatus is constructed in accordance with FIGS. 1 and 2 using eleven electrodes of titanium spaced 0.1 millimeters from each other in the same plane. The electrodes are about 5 centimeters in width, 1 centimeter thick and 20 centimeters in length. The electrodes are provided with an internal cavity for the flow of water as a coolant along the longitudinal axis of the electrodes. The electrodes are enclosed in a glass structure having a gas inlet on one side of the electrodes and a gas outlet on the other side of the electrodes, thereby providing a flow of gases through the electrode spacings. The electrodes are attached to the side walls of the glass enclosure, using glass insulating means. The terminal electrodes have metal extensions thereon which pass through the side wall of the enclosure to provide an attachment for a source of electrical current.

The present structure has a voltage drop of about 4000 volts at 3 millimeters of mercury pressure absolute at a current of 40 milliamperes with the gas feed temperature at about 25 degrees centigrade to provide a diffused glow discharge.

Chlorine oxides are produced using the described apparatus by first evacuating the apparatus to a pressure of about 0.1 micron of mercury and subsequently flushing with oxygen at a pressure of about 3 microns of mercury. The glow discharge is then initiated at a direct current of about 40 milliamperes to obtain a diffused glow discharge. Chlorine gas is then introduced into the reactor to obtain a chlorine to oxygen ratio of about 1:10, thereby producing a magenta glow discharge. The flow rate through the reactor is adjusted to provide a dwell time of the reactants in the glow discharge of less than 0.5 second. Gases withdrawn from the reactor are passed through a condenser cooled with liquid nitrogen to thereby collect the produced chlorine oxides.

While there have been described various embodiments of the present invention, the apparatus and methods described are not intended to be understood as limiting the scope of the invention, as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principle may be utilized.

What is claimed is:

1. A method of subjecting gases to an electrical glow discharge comprising the steps of feeding at least one gaseous reactant to a reaction chamber, wherein said reaction chamber is comprised of a reactant inlet means and a reactant outlet means separated by electrode means, said electrode means comprising two terminal electrically conductive parallel strips between which are positioned at least one similar conductive strip, said conductive strips being in a spaced relationship to each other in substantially the same plane and being electrically insulated from each other, said terminal strips having connecting means for the attachment of a source of electrical current; producing a glow discharge between said electrode means and a field gradient of about 100 to 10,000 volts per centimeter, passing said gaseous reactant through said glow discharge, maintaining the desired temperature within the glow discharge by passing a coolant through the interior of said electrodes, and subsequently exhausting said gases from said reaction chamber.

2. The method of claim 1 wherein the reactor is constructed of an inert material selected from the group consisting of glass, quartz, ceramic, and plastic.

3. The method of claim 1 wherein the number of electrodes used is 3 to about 50.

4. The method of claim 1 wherein the electrode distance is about 0.01 to about 5 millimeters from each other.

5. The method of claim 2 wherein the electrode distance is about 10 to 10,000 times the distance between adjacent electrodes.

6. The method of claim 1 wherein the electrodes are of a metal selected from the group consisting of platinum, gold, silver, titanium, tantalum, steel, chromium, nickel, copper and alloys thereof.

7. The method of claim 6 wherein chlorine and oxygen are fed into said reaction chamber.

References Cited

UNITED STATES PATENTS

| 577,636 | 2/1897 | Andreolli | 204—322 |
| 997,339 | 7/1911 | Steynis | 204—322 |

ROBERT K. MIHALEK, *Primary Examiner.*

U.S. Cl. X.R

204—312